United States Patent [19]

Matsumoto

[11] 4,143,955
[45] Mar. 13, 1979

[54] FLASH SYNCHRONIZATION CONTROLLING MEANS FOR PROGRAM TYPE ELECTRIC SHUTTERS

[75] Inventor: Kunio Matsumoto, Ageo, Japan

[73] Assignee: Copal Company Limited, Tokyo, Japan

[21] Appl. No.: 798,688

[22] Filed: May 19, 1977

Related U.S. Application Data

[63] Continuation of Ser. No. 567,840, Apr. 14, 1975, abandoned.

[30] Foreign Application Priority Data

Apr. 15, 1974 [JP] Japan ................................. 49-42618

[51] Int. Cl.² .......................... G03B 7/08; G03B 15/05
[52] U.S. Cl. ......................................... 354/34; 354/51; 354/60 F; 354/137
[58] Field of Search ................. 354/34, 51, 60 F, 130, 354/137, 138, 139, 146, 147, 33, 60 R, 149, 230

[56] References Cited

U.S. PATENT DOCUMENTS

| 3,587,433 | 6/1971 | Yata ................................... 354/51 X |
| 3,675,561 | 7/1972 | Schwarz .............................. 354/139 |
| 3,683,767 | 8/1972 | Sahara ................................ 354/51 |
| 3,683,769 | 8/1972 | Uchiyama et al. ................ 354/60 F |
| 3,720,144 | 3/1973 | Uchiyama ........................... 354/34 |
| 3,721,166 | 3/1973 | Yanagi ................................. 354/51 |
| 3,745,902 | 7/1973 | Taguchi ............................... 354/51 |
| 3,776,112 | 12/1973 | Wilwerding ..................... 354/34 X |
| 3,994,007 | 11/1976 | Uchiyama et al. ............. 354/230 X |

Primary Examiner—Michael L. Gellner
Attorney, Agent, or Firm—Cushman, Darby & Cushman

[57] ABSTRACT

A flash synchronization controlling circuit for program type electric shutters. A first switching circuit is utilized for controlling the shutter closing and a second switching circuit is connected to the first switching circuit and utilized for controlling the flash actuation in order that the flash synchronization controlling circuit may be simplified and to provide a very positive and stable flash synchronizing operation. The flash synchronization controlling circuit is arranged so that the switching operation of the second switching circuit can be effected earlier by a predetermined time interval than that of the first switching circuit.

16 Claims, 4 Drawing Figures

FLASH SYNCHRONIZATION CONTROLLING MEANS FOR PROGRAM TYPE ELECTRIC SHUTTERS

RELATED APPLICATION

This application is a continuation of my copending application Ser. No. 567,840 filed Apr. 14, 1975, which was abandoned after the filing of this application.

BACKGROUND OF THE INVENTION (a) Field of the invention

The present invention relates to program type electric shutters, and more particularly to a flash synchronization controlling means for program type electric shutters wherein the flash synchronizing action is made to be electronically controlled.

(b) Description of the prior art

There are program type electric shutters wherein the opening action of shutter blades is retarded so that the shutter blade opening characteristic curve may be made triangular and wherein the size of the opening of shutter blades is detected while the release button of the camera is pushed and the shutter is actually released so that the shutter blades may quickly open to a predetected opening position when the shutter is released and the shutter blade opening characteristic curve may be made trapezoid.

In this kind of program type electric shutter, anyhow, as the size of the opening formed by the shutter blades in photographing is automatically determined in response to the brightness of the object to be photographed in such case, in order to make the peak of the lighting of the flashing device coincide with the fully opened position of the blades, in the case of controlling the ignition time of the flashing device with a mechanical synchro-contact, the closing time of the synchro-contact must be moved in response to the size of the opening to be controlled. Therefore, in such system, there have been defects that the mechanical constitution is very complicated and that the synchronizing operation itself is unstable.

SUMMARY OF THE INVENTION

Therefore, a primary object of the present invention is to provide a flash synchronization controlling means for program type electric shutters wherein the flash synchronizing action is made to be electronically controlled so that the constitution of the entire means may be remarkably simplified and the flash synchronizing operation may be made very positively and stably.

According to the present invention, the above mentioned object is attained by connecting a second switching circuit for controlling the flash synchronization with a first switching circuit for controlling the closing time of shutter blades and by making the switching operation of the second switching circuit take place earlier by a predetermined time than the switching operation of the first switching circuit so that, however, the size of the opening of the shutter blades may vary, the flashing device may ignite prior by the predetermined time to the closing time of the shutter blades.

These and other objects of the present invention will become more apparent during the course of the following detailed description and appended claims.

DESCRIPTION OF THE PREFERRED EMBODIMENTS

Figure 1:
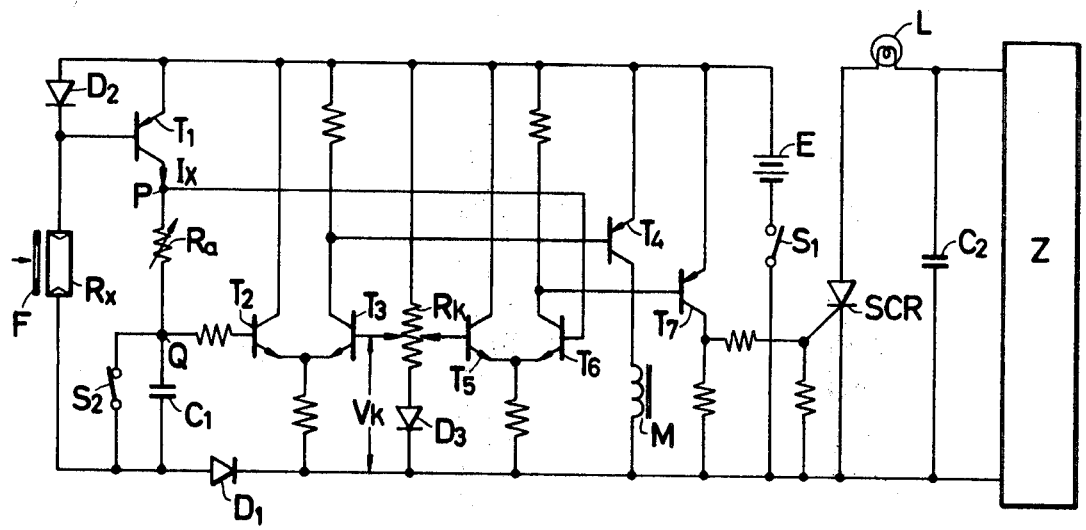
FIG. 1 is a circuit diagram showing a flash synchronization controlling means embodying the present invention.

First of all, in FIG. 1, reference symbol E represents a current source, symbol $S_1$ represents a current source switch, symbol Rx represents a photoconductive element, symbol $C_1$ represents a condenser, symbol $S_2$ represents a switch for starting a delaying action, symbol $T_1$ represents a transistor for making a constant current having the value determined in accordance with the resistance value of the photoconductive element Rx flow to the condenser $C_1$, symbols $T_2$ and $T_3$ represent transistors forming a differential amplifier, symbol $R_K$ represents a potentiometer for adjusting the voltage between the base and emitter of the transistor $T_3$, symbol $T_4$ represents an amplifying transistor, symbol M represents an electromagnet for controlling the closing operation of the shutter blades, and symbols $D_1$ and $D_2$ represents diodes for compensating voltages. The above mentioned elements constitute the same electric shutter circuit as the well known one. The above mentioned transistors $T_2$ and $T_3$ form a first switching circuit for controlling the closing time of the shutter blades. Symbol Ra represents a variable resistor connected in the above mentioned constant current circuit. Symbols $T_5$ and $T_6$ represent transistors forming a differential amplifier. The base of the transistor $T_5$ is connected to the above mentioned potentiometer $R_K$ and the voltage between the base and emitter of the transistor $T_5$ is associated with the voltage between the base and emitter of the above mentioned transistor $T_3$ so as to be kept at the same potential. Further, the base of the transistor $T_6$ is connected to one end of the above mentioned variable resistor Ra. Symbol $T_7$ represents a transistor. Symbol L represents a flash bulb. Symbol SCR represents a rectifying element with a controlling electrode attached to it corresponding to a conventional mechanical synchro-contact. Symbol $C_2$ represents a main condenser. Symbol Z represents a D.C. - D.C. converter. The above mentioned rectifying element SCR, main condenser $C_2$, converter Z and flash bulb L form a flashing device. The transistors $T_5$ and $T_6$ form a second switching circuit for controlling the flash synchronization.

Figure 2:
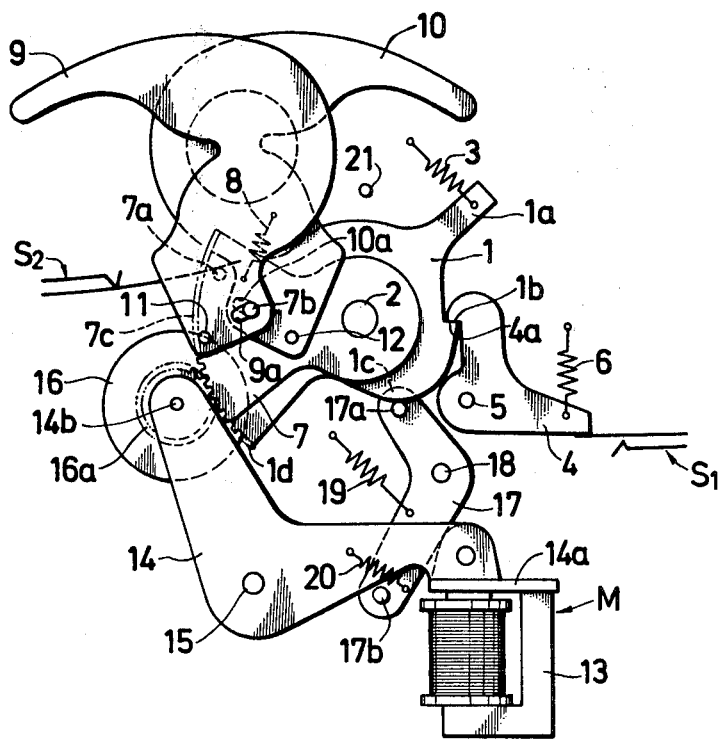
FIG. 2 is a plan view of an essential part of a shutter mechanism to which the flash synchronization controlling means shown in FIG. 1 is to be applied.

FIG. 2 shows an example of shutter blade opening and closing mechanism utilizing the above described electric shutter circuit. Its constitution shall be explained in the following. Reference numeral 1 represents a setting lever having an arm 1a, hook portion 1b, cam portion 1c and gear portion 1d, supported rotatably by a shaft 2 and biased counterclockwise by a spring 3. Numeral 4 represents a release lever having a hook portion 4a engageable with the hook portion 1b of the setting lever 1, supported rotatably by a shaft 5 and biased counterclockwise by a spring 6. Numeral 7 represents a shutter blade opening and closing member having pins 7a and 7b, having a gear portion 7c formed, supported rotatably by the shaft 2 and biased clockwise by a spring 8. In such case, the tension of the spring 8 should be so selected as to be smaller than the tension of the spring 3. Numerals 9 and 10 represent shutter blades having slots 9a and 10a respectively formed and supported rotatably respectively by pins 11 and 12 fixed to a base plate not illustrated. The slots 9a and 10a are both fitted to the pin 7b on the shutter blade opening and closing member 7. The movement of the shutter blades 9 and 10 is operatively connected also with a diaphragm means F arranged in front of the photoconductive element Rx as is briefly shown in FIG. 1. Numeral 13 represents an electromagnet corresponding to the electromagnet M in FIG. 1. Numeral 14 represents a magnet lever having an armature 14a facing the pole of the electromagnet 13 (M) rockably supported on one arm thereof and a shaft 14b erected on the other arm and rotatably supported by a fixed shaft 15. Numeral 16 represents a flywheel having a pinion 16a integrally formed and supported rotatably by the shaft 14b. The pinion 16a can mesh with both of the gear portion 1d of the setting lever 1 and the gear portion 7c of the shutter blade opening and closing member 7. Numeral 17 represents a holding lever having pins 17a and 17b respectively on both arms, supported rotatably by a fixed shaft 18 and biased clockwise by a spring 19. The pin 17a is engaged with the cam portion 1c of the setting lever 1 and the pin 17b is arranged in such position that the magnet lever 14 may be rotated counterclockwise by the clockwise rotating force of the holding lever 17. Numeral 20 represents a spring connected between the arm of magnet lever 14 on which the armature 14a is supported the arm of holding lever 17 on which the pin 17b is erected. Numeral 21 represents a stopper for restricting the counterclockwise rotation of the setting lever 1.

By the way, the movable contact piece of the current source switch $S_1$ is in contact with the release lever 4 and is so arranged that, when the release lever 4 is rotated clockwise, said switch $S_1$ may be closed. Also, the movable contact piece of the starting switch $S_2$ is engaged with the pin 7a of the blade opening and closing member 7 so that, when said member 7 is rotated counterclockwise, said switch $S_2$ may be opened.

The operation of the above mentioned means shall be explained in the following.

Figure 3:
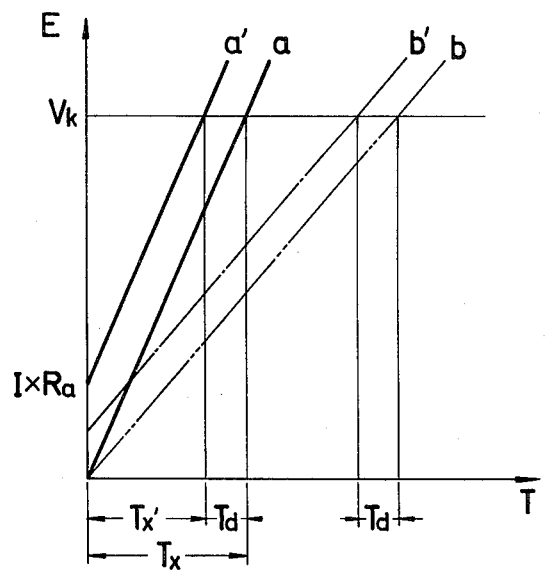
FIG. 3 is an explanatory diagram showing the operation characteristics of the circuit shown in FIG. 1.

The illustrated state represents the cocked state of the shutter. When the release lever 4 is rotated clockwise from this state by the operation of a release button not illustrated, first the current source switch $S_1$ will be closed, then the hook portion 1b and hook portion 4a will be disengaged from each other and the setting lever 1 will begin to be rotated counterclockwise by the spring 3. At the same time, the pinion 16a will be rotated clockwise and therefore the shutter blade opening and closing member 7 meshed with the pinion 16a will also begin to rotate counterclockwise integrally with the lever 1. In such case, by governor means effected by the action of the flywheel 16 and spring 8 the shutter blade opening and closing member 7 will be rotated at a comparatively low speed. On the other hand, the counterclockwise rotation of the shutter blade opening and closing member 7, and hence pin 7a, will cause the starting switch $S_2$ to open. With the opening of switch S2, an electric current Ix of the magnitude determined by to the resistance value of the photoconductive element Rx in response to the brightness of the objects to be photographed will flow to the condenser $C_1$. In such case, as shown in FIG. 3, the potential of the point Q (FIG. 1) will rise as in the curve a due to the charge with the constant current but the potential of the point P (FIG. 1) biased by IxRa by the presence of the variable resistor Ra will rise as in the curve a'. Therefore, the potential of the point P will reach a predetermined value $V_K$, which is to the base bias of the transistors $T_3$ and $T_5$ as set by the potentiometer $R_K$ prior to the potential at point Q reaching value $V_K$. When the current source switch $S_1$ is closed and the switch $S_2$ is initially opened, the condition of the circuit is such that transistor $T_2$ is off, and transistors $T_3$ and $T_4$ on, such that electromagnet 13 (M) is energized. Further, transistor $T_5$ is on and transistors $T_6$ and $T_7$ off such that rectifying element SCR is non-conductive and flash bulb L remains unlighted. As noted above the setting lever 1 rotates counterclockwise, at this point in the operation, under the tension of spring 3. As setting lever 1 rotates counterclockwise, cam portion 1c and pin 17a will be disengaged from each other and the holding lever 17 will be rotated clockwise by the spring 19. However, at this time, the armature 14a will be attracted by the electromagnet 13 (M) and therefore said lever 14 will be held in the illustrated position. By the counterclockwise movement of the shutter blade opening and closing member 7, the shutter blades 9 and 10 will open an exposure aperture and the film not illustrated will be exposed. As noted above, the potential at point P rises in accordance with curve a' ultimately attaining value $V_K$. At this point, when the potential of the point P reaches $V_K$, the transistor $T_5$ will turn off, the transistor $T_6$ will turn on, turning on transistor $T_7$, such that rectifying element SCR is rendered conductive to cause flash bulb L to flash. The rectifying element SCR with a controlling electrode attached to it will be on and the flash bulb L will be lighted to flash.

As noted above, and as will hereinafter be more fully explained, the potential at point Q reaches value $V_K$ a predetermined time interval after point P. When the potential of the point Q reaches $V_K$ after such predetermined time delay, the transistor $T_2$ will turn on, the transistor $T_3$ will turn off, turning off transistor $T_4$ to de-energize the electromagnet 13 (M). When the electromagnet 13 (M) is thus de-energized, the magnet lever 14 will be rotated counterclockwise by the holding lever 17 under the tension of spring 19. At this time, the pinion 16a will be disengaged from the gear portion 1d of the setting lever 1 and the gear portion 7c of the shutter blade opening and closing member 7. Shutter blade opening and closing member 7, previously rotated counterclockwise due to the tension of the spring 3 overcoming the tension of the spring 8, will be quickly rotated clockwise by the action of the spring 8 once no longer held to setting lever 1 by pinion 16a. Therefore, at this time, the shutter blades 9 and 10 will turn from the opening action to the closing action and will quickly close the exposure aperture to end the exposure of the film. By the way, in case the brightness of the object to be photographed is different from that in the above described case and the rising rate of the potential of the point Q is as in the curve represented by the symbol b in FIG. 3, the rising rate of the potential of the point P will be as in the curve represented by the symbol b'.

As described above, according to the present means, before the shutter blades 9 and 10 turn from the opening action to the closing action, that is, before said blades 9 and 10 form a diaphragm aperture determined by the resistance value of the photoconductive element Rx and the capacitance value of the condenser $C_1$, the flash bulb L will be lighted. This timing shall be discussed in the following. Now, if the magnitude of the electric current to charge the condenser $C_1$ is made Ix, the time Tx until the potential of the point Q reaches $V_K$ from zero will be Tx = $V_K$/KIx (wherein K is a constant). Further, the time Tx' until the potential of the point P reaches $V_K$ will be Tx' = ($V_K$ - IxRa)/KIx. The time difference Td between Tx and Tx' will be Td = Tx - Tx' = Ra/K. This fact means that the time difference Td can be set by selecting the value of the variable resistor Ra independently of the current value Ix. Thus, by properly setting the value of the variable resistor Ra by considering the lighting characteristic of the flash bulb L, the peak of the lighting can be made to coincide exactly with the fully opened position of the shutter blades.

Figure 4:
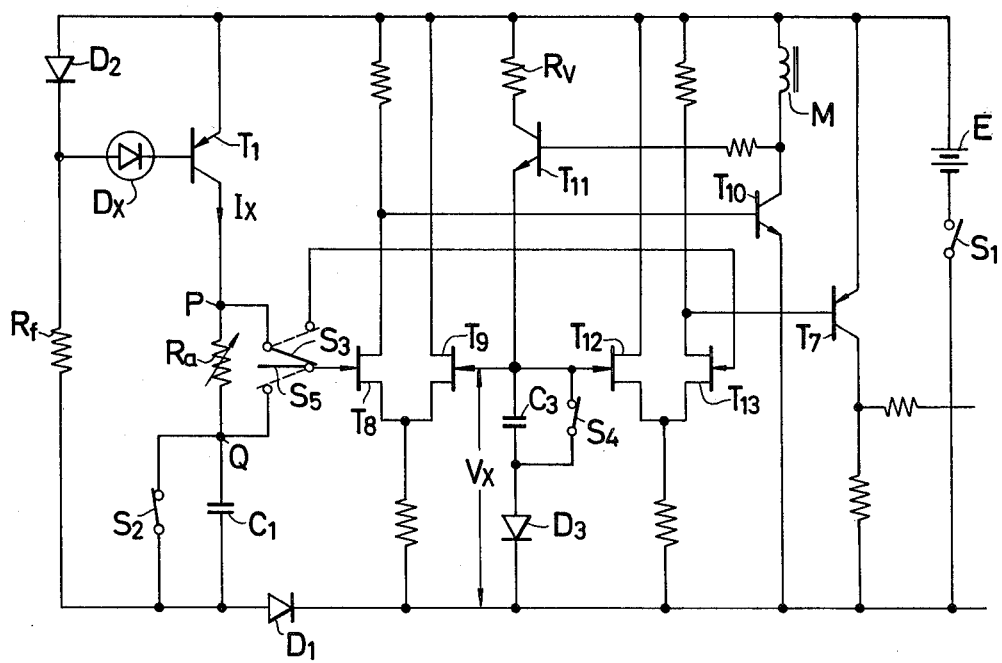
FIG. 4 is a circuit diagram showing another embodiment of the flash synchronization controlling means according to the present invention.

Another embodiment shall be explained with reference to FIG. 4 in the following. In this embodiment, the same respective symbols are attached to the elements acting the same as in FIG. 1. Symbol Dx represents a photoelectric element, symbol Rf represents a resistor, symbols $S_3$ and $S_5$ represent change-over switches, symbols $T_8$ and $T_9$ represent field effect transistors forming a differential amplifier, symbols $T_{10}$ and $T_{11}$ represent transistors, Rv represents a resistor, symbol $C_3$ represents a condenser for memory, symbol $S_4$ represents a switch and symbols $T_{12}$ and $T_{13}$ represent field effect transistors forming a differential amplifier. By the way, the collector of the transistor $T_7$ is connected to the control electrode of rectifying element SCR (not shown) in the same manner as in FIG. 1. In this embodiment, the transistor $T_8$ and $T_9$ form a first switching circuit and the transistor $T_{12}$ and $T_{13}$ form a second switching circuit. The shutter blade opening and closing mechanism to which this electric shutter circuit is to be applied is, for example, of a type wherein a set of shutter blades used also as diaphragm blades is used to operate so that, until the release button of the camera is pushed and then the shutter is released, an opening size controlling member may be moved at a constant speed and a CR circuit for determining the opening size of the shutter blades may be operated as synchronized with the beginning of the movement of said controlling member. When the potential of the condenser in said CR circuit reaches a potential corresponding to the magnitude of the photoelectric current generated in photoelectric element Dx, the movement of the above mentioned controlling member and the operation of the CR circuit may be stopped, then the shutter blades may be opened to a size corresponding to the stopping position of the above mentioned opening size controlling member and an exposure time controlling delay circuit including the above mentioned photoelectric element may be operated. When the potential of a condenser in said exposure time controlling delay circuit corresponds to the memory potential of the condenser in the above mentioned opening size controlling CR circuit, the shutter blades may be closed. This type of shutter blade opening and closing mechanism is disclosed in detail, for example, in U.S. Application Ser. No. 523,120, entitled "An electric shutter", and filed on Nov. 12, 1974, in the name of Kunio MATSUMOTO, now U.S. Pat. No. 3,953,865. Therefore, its detailed explanation shall be omitted here.

Now, the operation of this embodiment shall be explained. First of all, by the camera release operation, a release actuating member will be disengaged and will begin to move at a constant speed. In such case, the change-over switches $S_3$ and $S_5$ will be in the positions illustrated with solid lines. When the current source switch $S_1$ is closed with the beginning of the movement of the release actuating member, an electric current Ix corresponding to the voltage generated in the photoelectric element Dx in response to the brightness of the object to be photographed will flow between the emitter and collector of the transistor $T_1$, as a result, the gate of the transistor $T_8$ will be biased by the current Ix, the transistor $T_8$ will be on, the transistor $T_9$ will be off, the transistor $T_{10}$ will be off and the transistor $T_{11}$ will be on. On the other hand, the above described opening size controlling member will move following the movement of the release actuating member and the switch $S_4$ will be opened as synchronized with it. Therefore, the condenser $C_3$ will be charged through the resistor Rv and the collector and emitter of the transistor $T_{11}$. When the charging potential Vx of the condenser $C_3$ reaches the gate potential of the transistor $T_8$, the transistor $T_8$ will turn off, the transistor $T_9$ will turn on, the transistor $T_{10}$ will be on and the transistor $T_{11}$ will be off. When the transistor $T_{10}$ is on, the electromagnet M will be energized, the following movement of the opening size controlling member will be stopped by the energization and the shutter blade closing operation controlling member will be held. On the other hand, when the transistor $T_{11}$ is off, the charging to the condenser $C_3$ will stop. The charging potential of this condenser $C_3$ will be memorized as a base bias of the transistors $T_9$ and $T_{12}$ and this potential Vx corresponds to $V_K$ of the embodiment in FIG. 1. In the final stage of the movement of the release actuating member, the change-over switches $S_3$ and $S_5$ will be switched to the positions shown with the dotted lines in FIG. 4 and the shutter will be released. As a result, the shutter blades will quickly open to the position determined by the opening size controlling member and the switch $S_2$ will be opened as operatively connected with its opening operation. The exposure time at this time will be determined by the time until the potential of the point Q reaches the memory potential Vx of the condenser $C_3$ but the potential of the point P will reach the memory potential Vx still prior to the potential of the point Q and therefore the flashing device will be ignited in the same relation as in the preceding embodiment. As apparent from the above description, the potentiometer $R_k$ and the capacitor $C_3$ are used as a standard voltage setting circuit means for the first and second switching circuits.

By the way, the type of the exposure time control delaying operation is not limited to the constant current charging type. Further, in the embodiment in FIG. 1, in order to obtain the time difference Td, the variable resistor Ra is provided. However, instead of providing this variable resistor Ra, the time difference Td can be made to be obtained by setting the base potential of the transistor $T_5$ to be lower by a predetermined value than the base potential by connecting the base of the transistor $T_5$ with another potentiometer or making the base potentials of the transistors $T_3$ and $T_5$ separately settable as by changing the relative position of the two slides of potentiometer $R_K$.

Further, the present means has been explained by taking a flash bulb as an example of the flashing device but can be applied also to the case of using a strobodischarge lamp and can be also utilized for the purpose of correcting the guide number.

The shutter blade opening and closing mechanism is not limited to the type in which the shutter blades are also diaphragm blades but may be of a type in which opening blades and closing blades are separately provided. Further, the present means can be applied also to a type in which shutter blades are steppedly opened instead of the type in which a delaying device is made to act on the opening stroke of shutter blades.

Further, it can be applied also to a shutter of a type in which, in FIG. 1, the photoconductive element Rx is replaced with a variable resistor and, in FIG. 2, the photoelectric element Dx is excluded, the resistor Rf is replaced with a variable resistor and the variable resistor is operatively connected with a photographing distance adjusting member so that the diaphragm aperture (opening size) may be automatically adjusted in response to the photographing distance at the time of flash photographing.

I claim:

1. A flash synchronization control system for program type electric shutters comprising:
   at least one set of shutter blades;
   governor means for upon actuation releasably opening said shutter blades at a low speed;
   electromagnetic means, responsive to control signals applied thereto, for controllably effecting release of said shutter blades by said governor means to rapidly close said shutter blades;
   a first switching circuit, responsive to application of a first predetermined voltage to an input terminal, for generating said control signal to said electromagnetic means to effect said release of said shutter blades by said governor means;
   a second switching circuit, responsive to application of a second predetermined voltage, to an output terminal for generating an activation signal to said flash;
   means for generating a signal indicative of the brightness of the object to be photographed; and
   means, responsive to the actuation of said governor means and said brightness signal, for applying said second predetermined voltage to said second switching circuit input terminal and applying said first predetermined voltage to said first switching circuit input terminal a predetermined time interval thereafter, whereby said flash is activated at a time in accordance with the brightness of an object to be photographed after the actuation of said governor means and said shutter blades are closed said predetermined time thereafter.

2. The system of claim 1 wherein:
   said means for generating said brightness signal comprises photoelectric means for generating a constant current of an amplitude in accordance with the brightness of said object to be photographed; and wherein further
   said first and second means for applying said predetermined voltages comprises:
   a resistance, connected between said first switching circuit input terminal and said second switching circuit input terminal, and receptive of said constant current at the connection to said second switching circuit input terminal;
   a capacitance connected between said first switching circuit input terminal and a ground potential, and further switch means, cooperating with said governor means and coupled across said capacitance for initially applying said constant current to said capacitance in accordance with actuation of said governor means;
   whereby the respective voltages at said first switching circuit input terminal and said second switching circuit input terminal thereafter increase a substantially linear rate in accordance with the amplitude of said constant current, the instantaneous voltage at said second switching circuit input terminal being equal to the sum of the instantaneous voltage at said first switching circuit input terminal and a constant proportional to the product of said resistance and said current amplitude.

3. The system of claim 2 wherein said resistance is a variable resistor whereby said predetermined time interval can be varied.

4. The system of claim 2 wherein said first and second predetermined voltages are determined by voltages at respective second input terminals of said first and second switching circuits, and said respective second input terminals are connected at respective points in a voltage divider network to at least partially establish said predetermined time interval.

5. The system of claim 4 wherein said voltage divider network includes a variable resistance.

6. The system of claim 5 wherein said voltage divider further includes a diode.

7. The system of claim 1 wherein said first and second predetermined voltages are determined by voltages at respective second input terminals of said first and second switching circuits, and said respective second input terminals are connected at respective points in a voltage divider network to at least partially establish said predetermined time interval.

8. The system of claim 7 wherein said voltage divider network includes a variable resistance.

9. The system of claim 8 wherein said voltage divider further includes a diode.

10. The system of claim 2 wherein said first and second predetermined voltages are determined by voltages at respective second input terminals of said first and second switching circuits, and wherein said system further includes:
    a memory capacitor;
    means for charging said memory capacitor to a potential in accordance with the opening size of said shutter; and
    means for coupling said memory capacitor to said first and second switching circuit second terminals, to establish thereby said first and second predetermined voltages.

11. The system of claim 10 wherein said first and second switching circuits each comprises a pair of emitter coupled transistors.

12. The system of claim 10 wherein said first and second switching circuits each comprises a differential amplifier.

13. The system of claim 2 wherein said first and second switching circuits each comprises a pair of emitter coupled transistors.

14. The system of claim 2 wherein said first and second switching circuits each comprises a differential amplifier.

15. The system of claim 1 wherein said first and second switching circuits each comprises a pair of emitter coupled transistors.

16. The system of claim 1 wherein said first and second switching circuits each comprises a differential amplifier.

* * * * *